United States Patent [19]

Lalancette

[11] Patent Number: 4,645,784
[45] Date of Patent: Feb. 24, 1987

[54] MOULDED COMPOUNDING MIXTURES OF ADJUSTABLE DENSITY

[75] Inventor: Jean M. Lalancette, Sherbrooke, Canada

[73] Assignee: Societe Nationale de l'Amiante, Thetford-Mines, Canada

[21] Appl. No.: 511,626

[22] Filed: Jul. 7, 1983

Related U.S. Application Data

[63] Continuation-in-part of Ser. No. 303,499, Sep. 18, 1981, abandoned.

[51] Int. Cl.⁴ .................. C08L 67/06; C08L 63/00; C08L 61/04
[52] U.S. Cl. .................. 523/400; 524/439; 524/440; 524/594; 524/595; 524/596; 524/876; 523/500
[58] Field of Search .............. 524/594, 595, 596, 876, 524/439, 440; 523/400, 500

[56] References Cited

U.S. PATENT DOCUMENTS

| | | | |
|---|---|---|---|
| 2,326,000 | 8/1943 | Teeple | 524/594 |
| 2,367,296 | 1/1945 | Lutz | 524/439 |
| 2,910,449 | 10/1959 | Evans | 524/440 |
| 3,269,976 | 8/1966 | Ueda | 524/440 |
| 3,451,934 | 6/1969 | Hubbard | 524/440 |
| 3,491,056 | 1/1970 | Saunders et al. | 524/439 |
| 3,668,168 | 6/1972 | Self | 524/440 |
| 3,691,130 | 9/1972 | Logvinenko | 524/594 |
| 3,872,051 | 3/1975 | Tiedeman et al. | 524/440 |
| 3,953,394 | 4/1976 | Fox et al. | 524/440 |
| 4,009,146 | 2/1977 | Cork et al. | 524/440 |

FOREIGN PATENT DOCUMENTS

| | | | |
|---|---|---|---|
| 295088 | 7/1965 | Australia | 524/439 |
| 47-25691 | 7/1972 | Japan | 524/594 |
| 55-137177 | 10/1980 | Japan | 524/439 |
| 656475 | 8/1951 | United Kingdom | 524/439 |

OTHER PUBLICATIONS

Delmonte; Metal-Filled Plastics; Reinhold Pub. Corp.; 1961; pp. 4, 22, 23.
Katz et al.; Handbook of Fillers and Reinforcements for Plastics; Van Nostrand Reinhold Co.; 1978; p. 193.
Harper; Electronic Packaging with Resins; McGraw-Hill Book Co., Inc.; 1961; p. 123.

*Primary Examiner*—Lewis T. Jacobs
*Attorney, Agent, or Firm*—Cushman, Darby & Cushman

[57] ABSTRACT

There is provided a method for preparing cured moulded article of a predetermined density of from 1.66 to 9.0 which comprises selecting the resin and determining it % weight loss and % porosity under the curing conditions for the selected resin, then selecting a high density filler and a low density filler and resolving the equation:

$$K = \frac{100 - Y}{\frac{A}{HD} + \frac{B}{ID} + \frac{C}{R}}$$

wherein K is the desired density of the end product and has a value of from 1.66 to 9.0; HD is the density of the selected high density substantially water-insoluble material and has a value of above 3.2; ID is the density of the selected medium density substantially water-insoluble material and has a value of from 1.5 to 3.2; R is the density of the cured binding resin and has a value between 0.8 to 1.5; A is the percentage by weight of the selected high density filler having the density HD and has a value of from 10 to 90%; B is the percentage by weight of the selected medium density filler having the density ID and has a value of from 0 to 86%; C is the percentage by weight of the selected binding resin having the density R and has a value of from 4 to 70%; and Y is the porosity of the end product expressed in % of the volume of the moulded object.

5 Claims, No Drawings

MOULDED COMPOUNDING MIXTURES OF ADJUSTABLE DENSITY

This is a continuation-in-part to Ser. No. 303,499 filed Sept. 18, 1981, now abandoned.

BACKGROUND OF THE INVENTION

It is common practice to manufacture components of mechanical systems from plastic materials. Such components, although not as strong as metallic ones, still offer acceptable performances and quite often are much cheaper to produce. This economic advantage, along with the ease of production by automated techniques, renders plastic parts quite attractive in many areas where formerly only metallic elements were considered.

Many types of plastics have been used for the manufacture of mechanical devices, either thermoplastic such as polypropylene or thermosetting such as phenolics.

In the course of the design of a component made out of plastic, in certain cases it is very important to be able to adjust the density of the material to a predetermined value in such a way that the center of gravity of the end product will be at the desired position. When such an adjustment can be made, it is to be expected that the dynamic properties of the components (i.e. its behaviour when spinning or rotating) will be as required. If the density and weight of the component are not appropriate, in many instances either the whole system will have to be redesigned or the plastic part will perform very badly.

The current plastic resins have densities after curing from 0.8 to about 1.5, depending on the nature of the resins and the inert filler used. There have been reports of additions of high density materials to polymeric material to obtain plastics of higher densities but not disclosure has been found proposing a quantitative system for plastic compounding with inert fillers that would give an end product of preselected density. Rather, the presentations of the patent literature relates to increased densities by addition of high density material to plastic formulations, without precise relation to resulting gain in density versus percentage addition of high density filler. The presentation is either qualitative in terms of end densities or quantitative at best only for a specific mixture cited as an example. Nowhere is there disclosed a method of obtaining a plastic of preselected density from characteristics of a specific resin and filler.

This point is well shown by several references. In the "Handbook of fillers and reinforcements for plastics" edited by H. S. Katz and J. V. Milewski (Van Nostrand, 1978), it is said (page 193, Table 11-1) that the effect of addition of metallic particles to a resin matrix is a "function of volume loading" and that "densities increase in most cases". Other comments of the same authors on the same page indicate that the expected increase in density may vary substantially due to entrap air, moisture, etc. Therefore, it is obvious from these authors that the increase in density of a moulded plastic by addition of a high density filler will not be a simple linear relation projection but will have to take several factors into consideration, the density of the filler being only one of them. These authors present no mathematical relations relating those factors.

In a less recent text book by J. Delmonte ("Metal-filled plastics", Reinhold, 1961) it is indicated (page 4) that the incorporation of metallic particles in plastic increases the density. On page 22, this author indicates ranges of densities that can be obtained with the different metals but does not relate density to any specific formulation. Therefore, taking the teaching of Katz that density increases can be influenced by several factors and Delmonte's density ranges, there would be a rather elaborate series of trial and error tests before reaching a specific formulation for a product of specific density.

In U.S. Pat. No. 3,691,130 (D. Danilovich Logvinenko), it is taught that high density materials such as iron, cobalt, etc, can be incorporated in plastic matrix such as polyamids, epoxy resins or phenolformaldehyde resin, but no reference is made to the density of the resulting products.

A similar situation is noted in U.S. Pat. No. 3,451,934 (H. C. Hubbard), describing the manufacture of magnetic moulding material. Although the adjunction of high density iron is recommended, the effect of the iron on the density of the phenolic based material is not reported. With U.S. Pat. No. 2,910,449 (J. B. Evans) related to the manufacture of brake lining from phenolic loaded with several products, including iron, the effect of incorporation of high density filler on density of the end product is not shown. The patent granted to R. P. Lutz (U.S. Pat. No. 2,367,296) concerning leaded phenolic compounds also makes no reference to the density of the end product, and the situation is similar with C. P. Teeple (U.S. Pat. No. 2,326,000) using copper, lead or antimony as high density filler or Y. Ueda (U.S. Pat. No. 3,269,976) calling upon aluminum and copper as high density fillers.

Therefore, it would be high desirable to have a procedure enabling the formulation of moulded resinous products having a predetermined density. It would be an advantage if such a method would take into account both the densities of the resin and fillers and the variations in density induced by the moulding process, particularly the weight loss incurred by the selected resin in the course of the curing step and the porosity of the end product, whereby the trial and error approach that is used presently would be greatly simplified.

SUMMARY OF THE INVENTION

The invention is concerned with a method for the formulation of a moulded product having a density which can be adjusted to match that of any shaped metallic product having a density of from 1.66 to 9.0 by preparing a mixture of at least one filler having a high density above 3.5 to which may be added a filler to intermediate density of between 1.5 to 3.5 and a binding resin selected from phenolic resins, polyester resins and epoxy resins having after curing a density of from 0.8 to 1.50.

The present invention is therefore concerned with providing a method suitable for determining the appropriate quantities of selected filler or fillers and binding resin required to achieve a cured moulded product having a preselected density of from 1.66 to 9.0, while taking into account the variations in density induced by the moulding process and particularly the weight loss incurred by the moulding resin in the course of curing and the porosity of the end product.

DETAILED DESCRIPTION OF THE INVENTION

The desired moulded parts of the present invention are prepared by using the following equation (1):

$$K = \frac{100 - Y}{\frac{A}{HD} + \frac{B}{ID} + \frac{C}{R}} \quad (1)$$

wherein:

K is the desired density of the end product and has a value of from 1.66 to 9.0;

HD is the density of the selected high density substantially water-insoluble material and has a value of above 3.2;

ID is the density of the selected medium density substantially water-insoluble material and has a value of from 1.5 to 3.2;

R is the density of the cured binding resin and has a value between 0.8 to 1.5;

A is the percentage by weight of the selected high density filler having the density HD and has a value of from 10 to 90%;

B is the percentage by weight of the selected medium density filler having the density ID and has a value of from 0 to 86%;

C is the percentage by weight of the selected binding resin having the density R and has a value of from 4 to 70%;

Y is the porosity of the end product expressed in % of the volume of the moulded object.

In the practice of the invention, the value of K is the first to be determined since it is the value of the metal part to be replaced by the moulded plastic part of the present invention.

The second value to be determined is the quantity of binding resin to be used, the quantity of binding resin being from 4 to 70% by weight. This determination is premised on the intended use of the moulded plastic part to be prepared. If the moulded plastic part is to be subjected to high tensile efforts, a higher percentage of binding resin will be required and in this case the percentage will vary from 25 to 70% while when a low tensile strength moulded plastic part is required the amount of binding resin will be selected between 4 and 25%.

There is also an economic consideration involved in the selection of the binding resin and this consideration will tend to be very important, if not decisive in the selection of the percentage of the resin since this organic phase is by far the most expensive part in the formulation. In the following illustration a phenolic resin is used.

Once the selection of the binding resin has been made its density is also known, there is then selected the amount C of the binding resin in accordance with the intended use of the finished product once the moulding and curing conditions have decided upon. Accordingly the values of K, C and R in the general equation (I) have now been determined.

The next value to be determined is that of the porosity of the moulded part expressed in % and represented by Y in the general formula 1. The porosity is in function of the curing conditions in the mould. For example, if the curing is done under substantial pressure for example 200 to 1000 psi there will be no voids or pores in the moulded mass and in such a case the value of Y will be zero. On the other hand if the curing is done at slight pressure and at about room temperature some of the volatile materials generated will be entrapped in the moulded mass thus creating a porous mass. Accordingly, if one desires to produce a porous moulded part the percentage of porosity is determined by moulding two identical parts one by curing at room temperature and the other under pressure and elevated temperature and after curing the difference in weight will provide the % by weight of porosity in the moulded part which is the value of Y in the general equation.

Another method for evaluating the porosity Y is by microscopic examination of slides of the moulded resin in order to evaluate the porosity of the area of the pores in several slides.

It must be appreciated here that the parameter Y is an experimental value determined in the laboratory for a given polymer and conditions used for setting and curing. Those experimental data are essential for the prediction of the formulations.

Once the values of K, C, R and Y have been established under a given set of operating conditions and for a given resin, one then decides the nature of the high density filler and of the intermediate density filler, if one is to be used, so that there remains to determine by mathematical calculations the value of A and B and in order to illustrate these calculations the following resolution for the values of A and B will be made or understood by supposing the following.

It is desired to prepare a counterweight having a density K of 5.15 in accordance with the present invention. It is then decided that, since the counterweight will not be subjected to undue stress, a low percentage of resin can be used. For reasons of economy a phenolic resin, e.g. a phenol-formaldehyde resin having a density of 1.28 (R) after curing and as indicated by the manufacturer will be used in an amount of 8% (C) and the moulded counterweight will be cured under high pressure and heat and thus an essentially non-porous counterweight will be obtained so that Y is zero. At this point equation (1) can be written as follows:

$$K = \frac{100}{\frac{A+B}{HD\,ID} + 6.2} \text{ or} \quad (1)$$

$$K = \frac{100}{\frac{A}{HD} + \frac{B}{ID} + 6.2} \quad (2)$$

$$K\left(\frac{A}{HD} + \frac{B}{ID} + 6.2\right) = 100 \quad (3)$$

Since at the outset it was decided that the density K of the counterweight had to be 5.15, the formula can now be expressed as follows:

$$5.15\left(\frac{A}{HD} + \frac{B}{ID} + 6.2\right) = 100 \quad (4)$$

$$\frac{5.15A}{HD} + \frac{5.15B}{ID} + 32.04 = 100 \quad (5)$$

$$\frac{5.15A}{HD} + \frac{5.15B}{ID} = 67.95 \quad (6)$$

Since it was decided that iron would be the high density filler (HD=7.86) and calcium carbonate (a very cheap filler) would be the intermediate density filler (ID=2.93) these values for HD and ID can then be substituted in the previous equation (6) which then is as follows:

$$5.15A/7.86 + 5.15B/2.93 = 67.95 \quad (7)$$

thus reducing the original equation to two unknowns, namely A and B. Since it is known that $A+B+C=100$ and that the value of C is 8 we then have $$A+B+8=100$$

or $$A+B=92$$

so that the value of the iron is A and the value of calcium carbonate is:

$$B=92-A$$

Then by substituting this value of (A) in equation (7)

$$5.15A/7.86+5.15(92-A)/2.93=67.95 \qquad (8)$$

by solving equation (8) it is found that B or the amount of calcium carbonate is 6.96 and that A is 85.03.

If the accuracy of the density of the phenolic resin (1.26) is taken into account, the value of A (i.e.: the percentage of iron) is 85.03% and the percentage of carbonate (92−A) is 6.97%.

Therefore, the moulding composition is:
Iron: 85%
CaCO$_3$: 7%
Resin: 8%

These figures are demonstrated by the density observed for a formulation, as shown with Example 1.

In a compounding mixture, a degree of accuracy of about 0.15 density unit in the initial formulation is adequate since by minute adjustments in the weight of one of the components subsequent to calculations there will result in a product having the very precisive required density. The slight discrepancy of the calculated density against the experimental density of the finished product is believed to be due to the catalytic effect of the metallic filler and the curing of the binding resin.

The following is another illustration of the resolution of equation (1) where it is desired to prepare a component having a density K of 2.35 using a polyester resin having a density R of 1.35. It is known that with the particular resins to be used the porosity Y is 1.4%. In this case, it is desired that the finished product be able to withstand a fair amount of pressure so that more resin than in the first case will be used, to an amount of 33% (C) and the high density filler will be iron having a density HD of 7.86 while the selected intermediate density filler (B) will be calcined asbestos tailings having a density ID of 2.20.

Resolving equation (1) for the respective values of A and B, as was done previously, it is found that the calculated amount B of calcined tailings will be 25% and the calculated amount of iron will be 42%. Example 11 was prepared by using these calculations and the moulded component has the expected density of 2.35.

The following is a further illustration of the resolution of equation (1) where it is desired to prepare a motor base having a density K of 1.89, by using an epoxy resin having a density R of 1.34. Here again it is known from the manufacturer of the epoxy resin that a porosity Y of 0.9% is to be expected under the conditions used for moulding. In this case, it is important that the finished product be able to withstand high pressures so that the amount C of the selected epoxy resin, a very strong resin, will be 50%. Here also, the high density filler will be iron having a density HD of 7.86 and the intermediate density filler will be calcined asbestos tailings having a density ID of 2.20.

Resolving equation (1) for the respective values of A and B, as was done previously, it is found that the amount A of iron will be 25% and the amount B of calcined tailings will be 25%. Example 14 was prepared by using these calculations and again led to a moulded product of the expected density.

More than one high density filler can be used and in such a case the value of the term HD is determined by the average density of the mixture of high density fillers.

HIGH DENSITY FILLERS

As high density fillers, there is selected substantially water-insoluble metals or metal salts and even metal alloys or mixtures thereof. The usual criteria is that the density of the selected high density filler be above 3.2. As examples of suitable metals having a high density, there may be mentioned iron (7.86), zinc (7.4), copper (8.92) and lead (11.3), and similar metals. As examples of high density metal salts, there may be mentioned barite (4.50), pyrites (5.0), ilmenite (4.7), zircon (4.68) and rutile (titanium dioxide) (4.26) and the like. In most cases, the selection is premised on the cost of the high density filler at the time of use. The selected high density filler is granular in form and has an average particle size varying from −8 mesh to −325 mesh, depending on the finish required. The amount of high density filler will vary from 10 to 90% by weight.

INTERMEDIATE DENSITY FILLERS

Sometimes, it is advantageous to use a filler of intermediate density along with the high density filler and the binding agent. This procedure allows a better control over the density. And since these fillers of intermediate density are generally lower in price than the fillers of high density, the economy on the price of the moulded product is significant.

As intermediate density fillers there can be used substantially water-insoluble inert material and inorganic fillers having a density of from about 1.5 to about 3.2. As examples of suitable intermediate density inorganic filler that can be used in the present invention, there may be mentioned calcium carbonate (2.93), silica (2.26), clays (1.8-2.8), mica (2.7-3.1), phlogopite (2.5-3.0), calcined serpentine (2.1-2.3), asbestos fibers (2.2), fiberglass (1.5-2.0), rock wool (1.5-2.5) aluminum (2.7) and talc (2.7-2.8). The selected intermediate density filler is granular in form or fibrous and has an average particle size, in the case of the granular material of from −8 mesh to −325 mesh. The amount of intermediate density filler will vary from 0.00 to 86% by weight.

RESINS

As binding resins, there is used a resin having a density of from 0.8 to 1.50 after curing. The binding resin is used in an amount of from 4 to 70% by weight. The amount selected is based on the intended purpose of the finished moulded part. If the moulded part is to be subjected to stress or pressure, for example, a mortar projectile, then a greater amount of resin will be used to insure a greater binding of the inert filler or fillers to be used. Accordingly, when greater binding is desired, the amount of resin will be from 25 to 70%. On the other hand, when the moulded part will not be subjected to stress, for example, a door counterweight, then less resin will be required and in this case the amount of resin will vary from 4 to 25% by weight. This adjustment of resin depending on the type of required performances will influence the selection of the high density and medium density fillers so as to obtain the desired density.

The resins suitable for the purpose of the present invention are selected from phenolic, polyester and epoxy resins.

PHENOLIC RESINS

The phenolic resins useful for this invention are commercially available and are described in "The Chemistry of Phenolic Resins" by R. W. Martin, pg. 87-116, John Wiley and Sons Inc., NYC (1956) incorporated in its entirety herein by reference. Thus there can be used, for example, phenol-formaldehyde, cresol-formaldehyde and phenol-furfural.

Both heat-reactive resins or resoles and non-heat-reactive resins or novolaks are included in the definition of phenolic resins useful in this invention. They can be obtained commercially or can be synthesized by methods known in this art. Thus for example the resoles used herein are prepared by the base catalyzed condensation of a molar excess of formaldehyde or a methylene engendering agent such as hexamethylene tetramine with phenol per se or a phenol substituted with a lower alkyl having 1 to about 6 carbons e.g. m,p-cresol, o-cresol, p-t-butylphenol, p-hexylphenol. The novolaks are prepared by the acid catalyzed condensation of a molar excess of phenol 'per se' or a phenol substituted with a lower alkyl having 1 to about 6 carbons, e.g. m-cresol, m-t-butylphenol with formaldehyde or a methylene engendering agent such as hexamethylene tetramine. A heat-reactive hexamethylene-tetramine modified unsubstituted phenolic resin manufactured by Union Carbide Corp. and sold under the trademark BAKELITE® BKPA-5864 is also suitable as is the product sold under the trademark BRP-8176.

It is preferred to employ about 10-30% of phenolic resin based in the weight of the total composition and even more preferred to employ about 15-20% by weight of phenolic resin.

EPOXY RESINS

Epoxy resins constitute a well defined class of binding resins and are characterized by the opening of epoxy groups in the polymerization process.

A general description of the preparation of these epoxy resins is presented in the Encyclopedia of Polymer Science and Technology, Page 209-271, Volume 6, Intersciences Publishers, NYC, 1967. Another reference incorporated herein is "Handbook of Epoxy Resins" by H. Lee and K. Neville, McGraw Hill Book Co. Inc., 1967. The entire disclosure of the cited portion of the Encyclopedia of Polymer Science and Technology and of Lee and Neville are hereby incorporated by reference.

The epoxy resins used in accordance with the present invention are prepared from saturated polyhydric alcohols and phenols which contain no carbon to carbon unsaturation other than that which is present in the aromatic ring.

By the epoxy equivalency, reference is made the average number of 1,2-epoxy groups

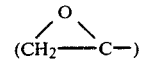

contained in the average molecule of the ether.

A preferred group of epoxy ethers for use in the invention is prepared by reacting a dihydric phenol with epichlorhydrin in alkaline solution. These products are of resinous character and frequently are solid materials at normal temperature (20°-30° C.) Any of the various dihydric phenols are used in preparing these glycidyl ethers, including mononuclear phenols like resorcinol, catechol, hydroquinone, etc., or polynuclear phenols like bis-(4-hydroxyphenol)-2,2-propane(bis phenol-A), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-hydroxy-2-tertiary butyl phenyl)-2,2-propane, bis-(2-dihydroxynaphthyl)-methane, 1,5-dihydroxy naphthalene, etc. The product may be represented by the formula:

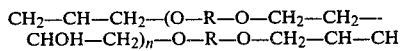

wherein n is an integer, e.g. from 1 to 7, and R represents the divalent hydrocarbon radical of the dihydric phenol.

There can be used 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency greater than one, such as the polyglycidyl ethers of glycol, diglycerol, erythritol, pentaglycerol, mannitol, sorbitol, and the like.

As an example of suitable epoxy resins, there may be mentioned BAKELITE® ERL-2744 of Union Carbide Corp. for a liquid bisphenol A epoxy resin having an epoxide equivalent of 185-200, BAKELITE® ERL-4221 of Union Carbide Corp. for a liquid cycloaliphatic epoxy resin having an epoxide equivalent of 131-143, EPON® 1002 of Shell Oil Co. for solid bisphenol A epoxy resins having an epoxide equivalent of 600-700, EPON® 1004 of Shell Oil Co. for solid bisphenol A epoxy resin having an epoxide equivalent of 870-1025, ARALDITE® 6010 of Ciba-Geigy Corp. for a liquid bisphenol A epoxy resin having an epoxide equivalent of 185-196 and a product manufactured and sold by Reichold under the trademark QT-1219. Thus there can be used, for example, bisphenol A-epichlorhydrin resins.

POLYESTER RESINS

The polyester resins are polymeric ester reaction products of one or more dicarboxylic acids and one or more polyhydric alcohols. Desirably, one or more of these reactants shall contain a reactive double bond or ethylenic linkage. Among the dicarboxylic acids which may be used are phthalic, malic, maleic, fumaric, isophthalic, adipic, pimelic, suberic, sebacic, itaconic, citraconic, and succinic acids and their anhydrides. It is essential that some of the dicarbocylic acid component of the polyester resin contain an unsaturated ethylenic linkage. For this reason, maleic and fumaric acids are most desirable. Among the polyhydric alcohols which may be used are neopentyl glycol, ethylene glycol, diethylene glycol, and propylene glycol. A mixture of propylene glycol and dipropylene glycol can be used. One may use an unsaturated monohydric alcohol in place of part of the polyhydric alcohol. A typical example of such an alcohol is allyl alcohol which produces an allyl ester of the dicarboxylic acid. The polyesters should comprise upward from about 15% or 30%, e.g., 50% to 85% by weight of the resin and resin forming component, e.g., styrene.

The resin component of the filled composition should also contain a non-volatile, monomeric, cross-linking solvent for the polyester resin. The function of this solvent is to make the polyester resin more fluid and also to cross-link the polyester resin at the time of curing to produce a cross-linked, or three dimensional resin with the polyester resin which is thermosetting in character. This monomeric solvent is an important member of the resin component, for it provides the necessary fluidity to the resin component, imparts thermosetting characteristics to the cured resin and is consumed during the curing of the resin without forming volatile materials.

Among the monomeric polymerizable solvents which may be used are the hydrocarbons: styrene, vinyl toluene, e.g., o-vinyl toluene, p-vinyl toluene, and m-vinyl toluene, cyclopentadiene; vinyl acetate; diallyl esters, e.g. diallyl phthalate and triallyl cyanurate, as well as alpha methyl styrene. Styrene has produced the most satisfactory results thus far. Of course various other monomers may be used including methyl methacrylate as a portion of the solvent. It will be observed that all of these monomeric polymerizable solvents which can be used for cross-linking are ethylenically unsaturated materials.

As an example of suitable polyester resins, there may be mentioned a product manufactured by Reichold and sold under the trademark No. 33402.

PIGMENTS

If desired colouring pigments may be added at time of formulation as is well known the art and the amount of colouring pigment usually added are so low as to have no influence on the density of the moulded product. This is particularly so with organic pigments, but when an inorganic pigment is used such as titanium dioxide it can be considered as a filler of intermediate density.

SELECTION OF METALLIC COMPONENTS AND RESINS

The selection of the metallic components, which are the agents responsible for the high density of the end product is made in taking many aspects into consideration. The first point is the density desired for the end product. With lead, it is possible to obtain end densities in the neighbourhood of steel or iron. Therefore, if a material of high density, around 7-9, is sought, then lead would be indicated. If the high density filler is not dense enough, either the end product will have a low density or the percentage of resin will be so low as to give a product with very little mechanical strength.

For product with densities around 4-5, iron, copper or zinc are adequate and here, it will be a matter of cost that might decide which metal will be used. Sometime, the color or the magnetic properties of the moulded product will be of significance: lead and copper will give a material which, although conductor of electricity, will be non-magnetic. With iron, the product will be magnetic.

Mechanical properties will also be an important consideration in the selection of metals; if high tensile strength is required, this will call for more resin; therefore, for a given density, lead rather than iron will be selected in order to decrease the percentage of metal in favour of resin.

As far the selection of resin, the technique or production will be an important factor for the selection: pressure moulding is normally done with phenolic. Epoxy resins will give more tensile strength but are much more expensive materials than either ethylenically unsaturated polyesters or phenolics. On the other hand, phenolics have good properties at moderate temperatures and, therefore, would be selected for uses above 100° C. Also, it is more difficult to obtain an homogeneous mixture with ethylenically unsaturated polyester or epoxy than with phenolic, specially if the concentration of the resin is relatively small (10-15%).

Therefore, it is the overall view of all these factors, technicall and economical that allows the selection of the components of the moulding mixture.

The process of the present invention being carried out by one skilled in the art will require, depending on the situation, the taking into consideration of the intended use of the moulded part. For example, if the moulded part is a mechanical part in a moving structure, relatively high tensile strength will be desired, while if the intended use of the moulded part is to be static, then high compressive strength will be desired. The same consideration will have to be made when the moulded part will be required to sustain only its own weight or be adjusted to a varying or constant compressive charge. Also, when high tensile strength is desired, a greater advantage will be obtained by using a fibrous filler such as calcined asbestos tailings instead of a non fibrous filler such as calcium carbonate.

When it is desired to obtain a low cost moulded product having a relatively low tensile strength of from about 500 to 1000 psi the recommended composition will comprise from about 4 to 15% by weight of binding resin, from about 6 to 25% by weight of intermediate density filler and from about 90 to 60% by weight of high density filler.

On the other hand when cost is not a problem and a high tensile strength of from 2000 to 5000 psi is desired in the moulded product the recommended composition will comprise from about 25 to 70% by weight of binding resin, with a preferred range of from 25 to 60% by weight, from about 75 to 30% by weight of high density filler and from 0 to about 10% by weight of intermediate filler.

Finally, when a low cost moulded product having a high compressive strength of from about 20000 to 40000 psi is desired the recommended composition will comprise from about 10-20% by weight of phenolic resin as the binding resin, from about 90 to 65% by weight of high density filler and from 0 to 15% by weight of intermediate density filler.

The present invention will be more readily understood by referring to the following Examples which are given to illustrate the invention rather than limit its scope.

EXAMPLES 1 TO 10

Compounding with phenolic resins

Procedure for compounding

The phenolic resin was from Bakelite (BRP 8176) with a granulometry of −200 mesh and was used as such without special treatment. The fillers of intermediate density and high density were screened to mesh −100. The components of the mixture were weighted to a precision of ±1 g. The percentage of composition is given in Table 1. The mixture was homogenized in a rotating drum (diam. 6.5 inches) for ten minutes (20 rpm). Weighted samples of the mixture were placed in a circular mold 2 inches in diameter, heated at 250°-300° F. and lubricated with wax (Randac 189-4EX-S). A pressure of 200 spi was applied on the heated charges during six minutes. The resulting cylinders were weighted, their volume and density determined along with resistance under compression. These results reported in Table I. With these examples, the value of "Y" was 0% and the density of the cured resin 1.28. Slight variations of these terms are to be expected from the presence the metals on the polymerization reaction.

TABLE I
COMPOUNDING WITH PHENOLIC RESIN

| Example No | Composition of compounding HD % | ID % | Resin % | Density Calcd | Density Observed | Resistance under compression (psi) |
|---|---|---|---|---|---|---|
| 1 | Iron 85 | CaCO$_3$ 7 | BRP 8176 8 | 5.15 | 5.15 | 32,150 |
| 2 | Iron 60 | Mica 10 | BRP 8176 30 | 2.90 | 2.93 | 11,140 |
| 3 | Lead 90 | Talc 3 | BRP 8176 7 | 6.90 | 6.92 | 14,650 |
| 4 | Iron 75 | Asbestos tailings 15 | BRP 8176 10 | 4.14 | 4.10 | 23,875 |
| 5 | Lead 97 | Nil | BRP 8176 3 | 9.15 | 9.00 | 4,800 |
| 6 | Copper 70 | Talc 5 | BRP 8176 25 | 3.44 | 3.39 | 13,050 |
| 7 | Zircon 65 | Calcined tailings 15 | BRF 8176 20 | 2.75 | 3.10* | 13,000 |
| 8 | Iron 75 | SiC 15 | BRP 8176 10 | 4.55 | 4.50 | 26,100 |
| 9 | Iron 85 | Fiber 4 | BRP 8176 11 | 4.68 | 4.75 | 28,650 |
| 10 | Barite 65 | Asbestos 15 | BRP 8176 20 | 2.72 | 2.80 | 16,500 |

*The discrepancy can be explained by hydration of calcined tailings.

EXAMPLES 11 AND 12

Compounding with polyesters

To an homogeneous mixture of the high density and medium density components, the polyester resin (Reichold No 33402) was added and stirred in order to give an homogeneous mixture. The resulting homogeneous mixture had a weight of 300 g in all experiments. The mixture was then transferred to a cylindrical mold having a diameter of 1.5 inch. A slight pressure (2–5 psi) was then applied to give a definite form to the sample. The sample was kept at room temperature in the mold for a period of one to two hours and then extracted from the mold. The volume, weight, density and resistance under compression were then determined and are reported in Table II. With these examples, the value of "Y" was 1.4% and the density of the resin 1.35.

TABLE II
COMPOUNDING WITH POLYESTERS

| Example No | Composition of compounding HD (%) | ID (%) | Resin (%) | Density Calcd | Density Observed | Resistance under compression (psi) |
|---|---|---|---|---|---|---|
| 11 | Iron 42 | Calcined tailings 25 | 33 | 2.35 | 2.35 | 18,300 |
| 12 | SiC 30 | Calcined tailings 30 | 40 | 1.85 | 1.77 | 12,000 |

EXAMPLES 13 TO 16

Compounding with epoxy

The procedure followed with epoxy resins is the same as the one reported for polyesters except that the resin used was an epoxy resin (Reichold QT-1219) and the curing time in the mold was 24 hours. The same measurements on the sampels were made and reported in Table III. Here, the value of "Y" is 0.9% and the density of the resin is 1.34.

TABLE III
COMPOUNDING WITH EPOXY

| Example No | Composition of compounding HD % | ID % | Resin % | Density Calcd | Density Observed | Resistance under compression (psi) |
|---|---|---|---|---|---|---|
| 13 | Lead 45 | Calcined tailings 23 | 32 | 2.54 | 2.67 | 11,000 |
| 14 | Iron 25 | Calcined tailings 25 | 50 | 1.89 | 1.89 | 8,300 |
| 15 | Iron 50 | Calcined tailings 15 | 35 | 2.48 | 2.42 | 9,500 |
| 16 | Copper 50 | Calcined tailings 15 | 35 | 2.54 | 2.54 | 9,700 |

I claim:

1. A method for preparing a cured moulded article having a density of from 1.66 to 9.0 which comprises:
    (a) selecting the desired density K of the moulded article between value of from 1.66 to 9.0;
    (b) selecting a binding resin from the group consisting of phenolic resin, polyester resin and expoxy resin, the selected resin having a density R after curing between 0.8 to 1.5 and being in the amount A of from 4 to 70% by weight;
    (c) determining the percentage of porosity Y in the cured moulded article under the moulding conditions to be used;
    (d) selecting a high density substantially inert and water-insoluble filler having a density HD of above 3.2;
    (e) selecting an intermediate density substantially inert and water-insoluble filler having a density ID of from 1.5 to 3.2 if desired;
    (f) mixing the amounts of binding resin, high density filler and intermediate density filler according to the equation:

$$K = \frac{100 - Y}{\frac{A}{HD} + \frac{B}{ID} + \frac{C}{R}}$$

wherein:

K is the denisty of the cured mixture and has a value of from 1.66 to 9.0;

A is the percentage by weight of the high density substantially water-insoluble filler and has a value of from 10 to 90% by weight;

HD is the density of the filler of the high density filler and has a value above 3.2;

B is the percentage by weight of the intermediate density substantially water-insoluble filler and has a value of from 0 to 86%;

ID is the denisty of the filler of medium density and has a value of from 1.5 to 3.2;

C is the percentage by weight of the cured binding resin and has a value of from 4 to 70% by weight;

R is the denisty of the cured binding resin and has a value of from 0.8 to 1.5;

Y is the porosity of the end product expressed in % of the volume of the moulded product, and (g) moulding and curing the mixture.

2. The method of claim 1, wherein the amount of binding resin is from about 4 to 15% by weight, the amount of high density filler is from about 90 to 60% by weight and the amount of intermediate density filler is from about 6 to 25% by weight.

3. The method of claim 1, wherein the amount of binding resin is from about 25 to 70% by weight, the amount of high density filler is from 75 to 30% and the amount of intermediate density filler is from 0 to 10% by weight.

4. The method of claim 3, wherein the amount of binding resin is from 25 to 60% by weight.

5. The method of claim 1, wherein the binding resin is a phenolic resin in an amount of from about 10 to 20%, the amount of high density filler is from about 90 to 65% by weight and the amount of intermediate filler is from 0 to 15% by weight.

* * * * *